United States Patent
Varone et al.

(10) Patent No.: US 9,129,139 B2
(45) Date of Patent: *Sep. 8, 2015

(54) SOLID STATE MEMORY AND METHOD FOR PROTECTING DIGITAL CONTENTS BY INTERRUPTING COPYING OR ACCESSING AND PROCEEDING ONLY UPON USER VERIFICATION OR AUTHENTICATION

(75) Inventors: Francesco Varone, Bellona (IT); Amedeo Veneroso, Caserta (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 145 days.

This patent is subject to a terminal disclaimer.

(21) Appl. No.: 13/531,942

(22) Filed: Jun. 25, 2012

(65) Prior Publication Data

US 2013/0007396 A1    Jan. 3, 2013

(30) Foreign Application Priority Data

Jun. 30, 2011    (IT) .............................. MI2011-A1222

(51) Int. Cl.
G06F 12/14    (2006.01)
G06F 21/31    (2013.01)
G06F 21/79    (2013.01)
G11B 20/00    (2006.01)

(52) U.S. Cl.
CPC ................ *G06F 21/79* (2013.01); *G06F 21/31* (2013.01); *G11B 20/0021* (2013.01); *G11B 20/00152* (2013.01); *G11B 20/00695* (2013.01); *G06F 12/14* (2013.01); *G11B 2020/00057* (2013.01); *G11B 2220/61* (2013.01)

(58) Field of Classification Search
CPC ............ G06F 12/14; G06F 2212/1052; G06F 2212/177; G06F 21/31; G06F 21/79; G11B 20/00152; G11B 20/0021

USPC .......................................... 711/164; 713/184
See application file for complete search history.

(56) References Cited

U.S. PATENT DOCUMENTS

| | | | |
|---|---|---|---|
| 6,134,657 A | 10/2000 | Johnson et al. | |
| 7,007,025 B1 * | 2/2006 | Nason et al. ........................ | 1/1 |
| 7,418,602 B2 * | 8/2008 | Yoshida et al. ............... | 713/193 |
| 7,516,220 B1 * | 4/2009 | Stiert ............................ | 709/225 |
| 7,992,202 B2 | 8/2011 | Won et al. | |
| 2006/0004974 A1 * | 1/2006 | Lin et al. ....................... | 711/164 |
| 2007/0030963 A1 | 2/2007 | Wyld et al. | |

(Continued)

FOREIGN PATENT DOCUMENTS

EP    2222081 A1    8/2010

*Primary Examiner* — Sanjiv Shah
*Assistant Examiner* — Glenn Gossage
(74) *Attorney, Agent, or Firm* — Allen, Dyer, Doppelt, Milbrath & Gilchrist, P.A.

(57) ABSTRACT

A solid state memory including a processor and a method for protecting the digital contents of the solid state memory. The microprocessor inserts at least an interruption during a copying or a reading of the digital contents and proceeds with the copying or reading only subsequent to a verification of a PIN or other user action. In particular, the verification provides control to ensure that the PIN is inserted manually. Access may be prevented if a time elapsed between the interruption and inputting of a PIN is shorter than a threshold time representing a speed of manual input, or if the PIN does not correspond to a sequence of requests for access to selectable files, which may be virtual files. The interruption may comprise substituting altered or cryptographic data if verification fails, or reproduction of an audio or visual message to be understood by the user.

16 Claims, 1 Drawing Sheet

(56) References Cited

U.S. PATENT DOCUMENTS

| | | | |
|---|---|---|---|
| 2007/0124201 A1* | 5/2007 | Hu et al. | 705/14 |
| 2010/0095062 A1 | 4/2010 | Koraichi et al. | |
| 2010/0125907 A1 | 5/2010 | Jonsson | |
| 2010/0161927 A1 | 6/2010 | Sprouse et al. | |
| 2010/0306152 A1 | 12/2010 | Altay et al. | |
| 2011/0022850 A1 | 1/2011 | Lee et al. | |
| 2011/0066818 A1 | 3/2011 | Yu et al. | |
| 2013/0007365 A1 | 1/2013 | Varone | |

* cited by examiner

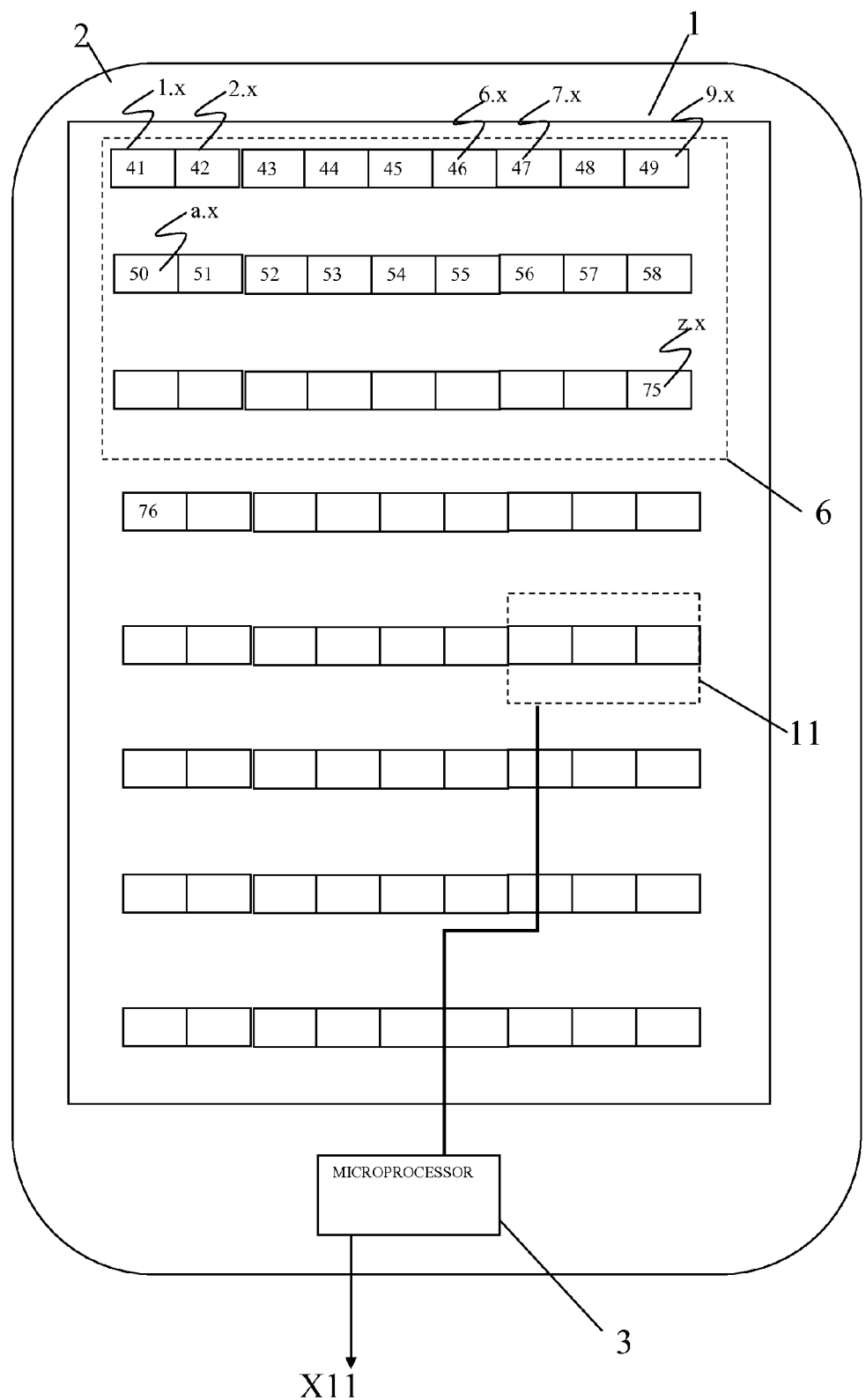

SOLID STATE MEMORY AND METHOD FOR PROTECTING DIGITAL CONTENTS BY INTERRUPTING COPYING OR ACCESSING AND PROCEEDING ONLY UPON USER VERIFICATION OR AUTHENTICATION

FIELD OF THE INVENTION

The invention relates to a method for protecting the digital contents of a solid state memory comprising a microprocessor. The invention also relates to a solid state memory comprising a microprocessor that protects the digital contents.

BACKGROUND OF THE INVENTION

As it is known, a solid state memory, for example an Integrated Circuit (IC) Card, a Subscriber Identification Module (SIM) or a Universal Serial Bus (USB) memory, comprises a microprocessor and is suitable for storing digital contents that can be read by an external device, for example by a cell phone, by a multimedia reader or by a personal computer. In particular, it is possible to protect the digital contents of the memory via software of the device, that is provided to set a protection password for the data and to enable their access only after a verification of the password. For example, the programs Winzip™ or Word™ allow the protection of the digital contents with a password.

Similarly, it is known to protect the digital contents with a program of cryptography of the device, that saves the data in memory in cryptographic format and allows their reading only via a de-cryptography key. However, it is not possible to access the digital contents of the memory when it is transferred to an external device devoid of the software of cryptography, also knowing the protection password or the cryptography key.

Moreover, some reading devices of the solid state memory have a limited input interface and do not allow the input of a protection password; for example, an mp3 reader is provided with a cursor for the selection of the music pieces, for their activation, interruption or end but it is not provided with an alphanumeric keyboard for the insertion of a password.

Finally, even if in the cryptographic format, the digital contents can be copied by the solid state memory onto another storage device, and attempts made to identify the de-cryptography key and reach the content of the digital contents for free.

There is a need to protect a solid state memory that is integrated in the memory device, i.e. able to protect its digital content independently from the device reader connected thereto, i.e. independently from the software or from the interface the device is provided with, and prevent copying or reading of the digital contents in plain or cryptographic format.

SUMMARY OF THE INVENTION

The technical problem underlying the present invention is that of devising a method for protecting a solid state memory that is integrated in the memory, i.e. able to protect its digital content independently from the device reader connected thereto, i.e. independently from the software or from the interface the device is provided with, preventing copying or reading of the digital contents in plain or cryptographic format, and substantially overcoming the limits and the drawbacks still affecting the known protection methods and solid state memories.

The approach underlying the present invention is that of programming a microprocessor of a solid state memory able to interrupt the reading or the writing of the digital content of the memory and to allow the continuation of these operations only in the presence of a user authorized to use the contents. In particular, according to this approach it is provided to request a PIN for the operations of reading or copying of the contents and to verify if the insertion of the PIN is executed according to modalities associated to the user or to a software for identification of the PIN.

It is provided that the PIN is a random and variable value generated by the microprocessor and communicated to the user via a reader of the memory, according to predetermined modes that comprise, for example, a reproduction of a sound message substituted or mixed in a sound file of the memory, in turn reproduced by the reader. The user that is listening to the digital content is able to receive the sound message corresponding to the PIN and to insert the PIN, via a user interface of the device, for proceeding with the copying or reading of the digital content.

It is provided that the microprocessor prevents the access in reading or writing if the PIN is inserted too quickly, i.e. at a speed that is not associated with a manual insertion; it is also provided that the microprocessor requests reiteratively the PIN, even if the PIN is inserted correctly, if the transfer of the digital contents from the memory to the device, for example a video or sound file, occurs at a higher speed than the reproduction of the contents, i.e. at the listening of the sound or at the display of the video.

Advantageously, the protection method is intrinsic of the solid state memory, since it is implemented by the microprocessor on board the memory device, and is independent from the reading or writing device.

According to this approach, the technical problem is addressed by a method for protecting the digital contents of a solid state memory comprising a microprocessor, characterised in that the microprocessor inserts at least an interruption during a copying or a reading of the digital contents and goes on with the copying or reading only subsequent to a procedure of authentication of a user. In one embodiment, the procedure of authentication corresponds to a verification of a PIN; preferably, the PIN is a variable and random value generated by the microprocessor.

In another embodiment, the procedure of authentication corresponds to a verification of an action executed by the user via a reader device of the memory, this action being associated with a reading, listening, viewing or interpretation of the digital contents by the user.

The interruption of the copying or of the reading of the digital contents make these contents substantially non-usable, in the absence of the authentication of the user; for example it is provided to replace the digital contents with altered data or to degrade or cipher the digital contents. In this case, the microprocessor ends the reading or copying of the digital contents and, after the authentication (without recognition) of the user, goes on with the copying or reading with altered, degraded or ciphered data.

It is also provided that the interruption of the copying or of the reading of the digital contents comprises a reproduction of a sound, visual or graphic message that can be understood by the user; the understanding of the message is necessary for executing the procedure of authentication. The sound, visual or graphic message that can be understood by the user and necessary for executing the step of authentication, can be alternatively inserted during the copying or reading of the digital contents, before the interruption.

Advantageously, if a user is not present during the copying or the reading of the multimedia content or does not insert the PIN requested according to the modes provided, the copying or the reading is interrupted; in this way it is possible to prevent the software from copying automatically all the content of the memory.

According to the present approach, it is possible to prevent the writing of a solid state memory, by inserting an interruption during the writing and proceeding with the writing only after the verification of the PIN. The method realizes an advantageous protection against the software copy of the digital contents from the Internet, that operate continuously for downloading huge amounts of data, for example video or sound, on the memories of local devices, for example on the hard disk of a personal computer. In fact, after the writing of a first portion of the data, the microprocessor of the memory interrupts the copying process and requests a user password.

According to an aspect, the verification of the PIN comprises a calculation of the time elapsed between the interruption of the copying or of the reading and the insertion of the PIN; in particular, the microprocessor prevents the prosecution of the copying or reading if the time elapsed is shorter than a predetermined time measure, representative of the manual insertion speed of the PIN. In this way, a reduced time is associated with a software copy and a longer time is associated with the user. According to this aspect of the invention, also in case a software copy were programmed for simulating the user insertion, the time necessary for identifying the correct PIN would be less attractive for a hacker. Moreover, it is provided that the request for the PIN is executed reiteratively by the processor, further increasing the time necessary for copying the digital contents.

According to another aspect, the verification comprises the comparison of a sequence of inputs, corresponding to the PIN, and of a predetermined sequence of inputs, and prevents the processing of the copying or reading if the PIN does not correspond to the predetermined sequence of inputs.

In a preferred embodiment, the time elapsed between the interruption of the copying or of the reading and the insertion of the PIN comprises the sum of the times elapsed between the insertion of successive inputs of the sequence of inputs. For example, the input can be a sequence of n alphanumeric characters and the microprocessor sums the time elapsed between a request for the PIN and the first character entered by the user and the times elapsed between the keyboarding of the (i+1)-nth character and of the i-nth character, with $1<i<n$.

It is provided that the microprocessor inserts the interruptions of the copying or of the reading in random mode. Other embodiments are however provided; for example, it is provided that the request frequency of the PIN is proportional to the number of wrong trials of insertion of the PIN, i.e. the more wrong trials are made, the greater is the number of requests of the PIN for copying or reading a content. Vice versa, if the PIN is inserted always correctly, it is provided that the requests are reduced in the time.

According to another aspect, the microprocessor detects a speed of the copying or reading and inserts the interruption only if the speed detected, for example 8×, is higher than a speed of reproduction of the digital content, for example higher than a display or listening speed of the digital content, i.e. 1×. An implementation of the method is also provided in which the PIN is not requested if the speed of copying or reading of the digital content is not accelerated.

The insertion of the PIN by the user can be simulated by an application of the solid state memory that respects the modes of insertion above specified. In this case a further protection of the content is provided that includes a communication between the application and a remote server of authentication of the application. In this case it is the remote server that supplies the application with the PIN.

The method aspect can be implemented in any solid state memory; in particular, it is suitable for the protection of SIM memories, whose digital contents are sensitive data associated with the user.

In a preferred embodiment, the PIN is inserted by selecting specific portions of the digital content; advantageously, any device able to read the memory, possibly also a device devoid of alphanumeric insertion interface, can be used for inputting the PIN. The method is effectively intrinsic of the memory since it does not request any interface or protection software of the device.

In particular, the PIN comprises a plurality of requests for access to physical blocks of the memory and the predetermined sequence of inputs is a sequence of requests for access to physical blocks corresponding to a predetermined sequence of requests for access to file(s) of the memory, that can be selected by the device.

Preferably, the verification of the PIN is executed at the activation of the solid state memory, and substantially before a significant copying of the digital content has started. However, it is possible that the copying of some bytes, not significant, is allowed and after interrupted by the request for the PIN. For example, the predetermined sequence of requests for access to the physical blocks is verified at the activation of the solid state memory, as a PIN for access to the memory or immediately after the copying of some bytes of the digital content of the memory.

If the predetermined sequence of requests for access to physical blocks does not occur, the microprocessor transfers cryptographic data, instead of the digital contents in plain format. The digital content copied thus cannot be used or the content reproduced in reading cannot be substantially understood by the user.

The cryptography can be executed at the verification of the predetermined sequence of requests for access and on all the digital contents of the memory, if the predetermined sequence of requests for access does not occur. In a preferred embodiment, the blocks of the predetermined sequence are associated with non erasable files of the memory or with virtual files. In this way, it is always possible to insert the PIN for access to the memory.

The technical problem above described is also addressed by a solid state memory characterized in that it comprises a microprocessor programmed for inserting at least an interruption in a copying or reading of digital contents of the memory, for verifying a PIN and for proceeding with the copying or reading only after having verified that the PIN is inserted correctly. Similarly with respect to the copying or reading of the content, the microprocessor can also protect the writing of the memory.

In particular, the microprocessor prevents the copying or reading if the time elapsed between the interruption of the copying or reading and the insertion of the PIN is shorter than a predetermined measure of time, representative of the speed of a manual insertion of the PIN. Advantageously, requesting the insertion of a PIN, the method ensures the effective presence of an authorized user for going on with the copying of the content at a high speed and prevents the fraudulent copying via automatic software, that operate day and night.

The microprocessor prevents the copying or the reading if the PIN does not correspond to a predetermined sequence of inputs. According to a preferred embodiment, the microprocessor controls the requests for access to the physical blocks of the solid state memory and proceeds with the copying or reading only after a verification of a predetermined sequence of requests for access to physical blocks, the predetermined sequence of requests for access to physical blocks corresponding to a predetermined sequence of requests for access to logic or virtual file(s) of the memory, that can be selected by a device and corresponding to the PIN.

BRIEF DESCRIPTION OF THE DRAWINGS

Further characteristics and advantages of the method and of the memory according to the present invention will be apparent from the following description made with reference to the annexed drawing, given only by way of non limiting example of the scope of protection.

The FIGURE is a schematic diagram illustrating a solid state memory, according to the present invention.

DETAILED DESCRIPTION OF THE PREFERRED EMBODIMENTS

With reference to the FIGURE, a solid state memory 2 is schematically shown that implements the protection method according to the present approach. The memory may be, for example, a SIM card for a cell phone or micro-Secure Digital (micro-SD) or a memory for digital camera (these examples are however given without any limitation of the invention). In particular, the memory 2 comprises a microprocessor 3 and stores digital contents, for example sound files, videos, text or digital documents. The digital contents of the memory can be reproduced, for example by displaying a movie or emitting a sound, via a player software included in the memory itself or in a reading device of the memory. The digital content of the memory can also be copied, via the device, on another storage media, according to known techniques. Similarly, the memory can be written, for storing new digital content.

According to the present approach, during the reading or the copying of the content, the microprocessor 3 requests an input from the user and allows activation of, or proceeding of, the operations of reading, writing or copy of the digital content only if the PIN input is correct. The input is for example requested at the activation of the storage device, i.e. when the memory is made available by the respective device, or is requested after having started one of the above cited operations of copying, reading or writing.

The PIN to be entered is not necessarily a fixed and/or secret value but may be a random value generated by the microprocessor 3 and communicated to the user before the request for input. Preferably, the insertion of the PIN is executed via a selection of predetermined files of the memory, in a predetermined sequence. The selection of a file that participates in the definition of the PIN or of a different file, i.e. of any user file, cannot be distinguished from the device. In fact, it is the microprocessor of the solid state memory that interprets the access to the predetermined files as a step of a procedure of authentication of the user and of enabling of the access of the digital contents of the memory. Even more in particular, the microprocessor controls the physical blocks or the cluster 6 of the memory associated with the files requested by the user and determines that the PIN inserted is correct if the physical blocks or clusters requested correspond to predetermined physical blocks or clusters, and if the selection of these blocks occurs in a predetermined sequence. As will be apparent from the following description, it is provided that the files associated with the PIN are virtual files, i.e. files not present in memory but simulated by the microprocessor during the request for the PIN.

According to a preferred embodiment of the invention, the microprocessor executes a detection of some parameters inherent to the data flow from and to the memory, for example the bit-rate or the duration of an interval of pause between successive readings of files of the memory, and associates the parameters detected with a possible manual request for the digital content or with a possible automatic request. It is worth specifying that the term "manual" means a request of copying or of reading a content that is executed manually by the user, for example by selecting a file with a user interface, that is provided, for example, to position itself on the file and of executing it via a play function or of copying its content via a copy and paste function. Vice versa, the term "automatic" means for example a copy or a reproduction of the contents executed at high speed, and activated by the machine, i.e. by a program stored therein. In particular, according to the method of the invention, the high speeds of copy or reproduction are ascribed to the machine, i.e. they are classified as automatic. In other words, the microprocessor inserts at least an interruption during a copy or a reading of the digital contents and goes on with the copy or reading only after a verification of the PIN. Preferably, the interruption is inserted when the parameters inherent to the flow from and to the memory are ascribed to an automatic copy or reading and not to the normal use of the memory by the user.

The microprocessor executes the detection of the parameters also during the inputting of the PIN; in this case, the microprocessor prevents the execution of the copy or of the reading if the time elapsed between the interruption and the insertion of the PIN is ascribed to an automatic process, for example if it is shorter than a predetermined time measure and on average corresponding to the speed of selection of a piece by the user.

In an embodiment it is provided that the microprocessor alternates the reading or the copying of the digital contents with a request for PIN, this request comprising specific actions to be executed on the digital contents. For example, in the case of a video or sound file, it is provided that the microprocessor requests the user to interrupt the execution for a predetermined number of seconds, via a "pause" key of an interface of the device and then to start again the execution with the "play" key. In other words, the PIN is not necessarily a sequence of numeric or alphabetic characters but can be a request for executing actions that can be executed via any device able to read the solid state memory.

According to this aspect with reference to the FIGURE, some physical blocks of memory 41, 42, . . . , 76, . . . are schematically shown. Each physical block 41, 42, 43, . . . is identified by a respective numeric address, that can be used by the reading device for accessing the data of the memory. In particular, an input/output (I/O) circuitry of the memory manages the addresses of the physical blocks and the transfer of the data to the device, as well as the control of the errors (error checking) of addressing or of transfer. The physical blocks are associated with logic files or virtual files of the memory, i.e. with files that can be identified via a user interface of the device suitable for reading the memory. The physical blocks are involved in the identification of the PIN; in particular, the microprocessor 3 interprets a predetermined sequence of requests for access to the physical blocks of the memory as a password of access to its content.

More specifically, the microprocessor 3 controls the requests for access to the physical blocks 41, 42, 43, . . . and allows the prosecution of the reading or of the copy of the digital contents only after the verification of the occurrence of the specific sequence of requests for access to the physical blocks. In other words, if the device is connected with the memory for accessing the contents, the microprocessor prevents their copy or reading until a predetermined sequence 42, 47, 46, 50 of requests for access to the physical blocks occurs. This predetermined sequence corresponds to a predetermined sequence 2.x, 7.x, 6.x, a.x of requests for access to logic or virtual file(s) 1.x-9.x, a.x-z.x of the memory that can be selected by the device and can be seen by the user. For example, the method provides that a sequence of n requests for access to the files of a music "compilation" are executed via the interface of a device IPod able to scroll the music files, in a predetermined sequence, before the music files are effectively made accessible for the IPod for the reproduction or copy. Always by way of example, the method provides that n files are selected by a solid state memory of the USB type, in a predetermined sequence, via a mouse and a relative personal computer that displays, with a known resource exploring application, the list of the files of the memory USB.

In all these cases it is the microprocessor of the solid state memory that determines the effective access to the content of the memory and interprets the request for access to the file associated with the sequence as a step of a procedure of authentication of the user.

According to another aspect, it is provided that the file that can be selected by the user and associated with the physical blocks of the memory are generated by the memory itself as virtual files. For example, according to the invention, a solid state memory for the storage of sound files, can automatically generate the virtual files 1.MP3, 2.MP3 . . . 9.MP3 and/or A.MP3, B.MP3, . . . Z.MP3 etc. These files can be selected by a sound reader device, as normal sound files. The content of the virtual files can be conformed to that of the other files, for example virtual files with extension .MP3.

In an embodiment, the microprocessor does not allow the prosecution of the copy or of the reading if the predetermined sequence 42, 47, 46, 40 of requests for access to the physical blocks does not occur previously. The sequence is verified at the activation of the solid state memory, as a PIN for access to the memory or immediately after the copy of some bytes, per se not representative of the whole digital content. Advantageously, the PIN is not stored in the memory but associated with the sequence of requests for access to the physical blocks.

In an embodiment, it is provided that the microprocessor allows the execution of the copy or reading of the data in cryptographic format X11 in response to the request for files 11 by the requesting device. The cryptography can be executed after the control of the predetermined sequence 42, 47, 46, 40 of requests for access and on all the data 1 of the memory, if the predetermined sequence 42, 47, 46, 40 of requests for access does not occur.

In an embodiment, it is provided that, after the control of the predetermined sequence 42, 47, 46, 40 of requests for access and on all the data 1 of the memory, if the predetermined sequence 42, 47, 46, 40 of requests for access does not occur, the microprocessor allows the prosecution of the copy or reading, but replaces the effective content of the memory with altered data, for example a silent sound recording, a static or "plane" video or sound, graphic or video data of request for the PIN and of the corresponding random value generated by the microprocessor or a request for executing a predetermined action via a user interface of the reader device or the data derived from the mixing or from the superimposition of the original file with the above messages.

According to an embodiment, the microprocessor is programmed for receiving a deactivation command of the request for the PIN; this embodiment is preferred in case the user, during the use of the multimedia contents, is also occupied in other activities, for example he/she is occupied in driving a vehicle while listening to the music pieces of the solid state memory. It is provided that, when the function of request of the PIN is deactivated, the microprocessor executes alterations of the digital content without preventing its use, i.e. the listening or the displaying. The copies not authorized are of poor quality.

A degradation of the quality of the content is for example provided after a predetermined time of reading of the digital content. In the case of sound content, it is provided to compress the dynamic range or to cut the high frequencies starting from a predetermined frequency, for example of 12000 Hz, or to cut the low frequency or to prolong the pause at the end of each sound recording, to reduce its duration, to alter its harmonic purity, to insert a background noise. It is also provided to insert a synthesized phrase that incorporates an identifying code of the player, for making recognizable, to the authorities, the author of the unauthorized distribution. According to another embodiment, an alteration of the digital content is provided which increases its dimension, for example increasing the bit-rate without improvement of the quality.

According to another embodiment, the request for the PIN is presented by the microprocessor as CAPTCHA (completely automated public Turing test to tell computers and humans apart), i.e. under the form of one or more requests for determining if the user is a human. This request can be presented as a string of deformed characters, blurred or altered or as sound requests, for example by randomly modulating a pronunciation tone, preserving the mean power and other sound parameters when the sound generated is mixed with the content. In this way the possibility that a software of automatic recognition detects the sound is reduced.

In the particular case of a video, it is provided to request the PIN in a starting menu of the video and to execute the selection of the PIN with the remote control. In this case, according to the invention, the menu is dynamically generated by the solid state memory and can be different at each execution. Also in this case the reader device of the memory and the relative programs for handling the interaction do not execute any inherent operation apart from skipping in different points of the sound or video file that correspond to the keyboarding of the PIN.

The technical problem underlying the present approach is also solved by a solid state memory device comprising a memory and a microprocessor programmed for inserting at least an interruption in a copy or reading of digital contents of the memory, for verifying a PIN and for proceeding with the copy or reading only after having verified that the PIN is inserted correctly. The microprocessor prevents the execution of the copy or reading if the time elapsed between the interruption and the insertion of the PIN is shorter than a predetermined time measure, representative of the speed of a manual insertion of the PIN.

In particular, the microprocessor comprises a controller of the requests for access to the physical blocks 41, 42, 43, . . . of the memory, and is programmed for proceeding with the copy or the reading of a file 11 of the memory, requested by a requesting device, only after a verification of a predetermined sequence 42, 47, 46, 50 of requests for access to physical blocks, each physical block corresponding to a file 1.x, 2.x, . . . , 9.x, a.x, b.x, z.x that can be selected by the device. This file 1.x, 2.x, . . . , 9.x, a.x, b.x, . . . , z.x can be a logic or virtual file.

Preferably, the name 1, 2, . . . , 9, a, b, . . . , z of the predetermined files 1.x, 2.x, . . . , 9.x, a.x, b.x, . . . , z.x corresponds to a respective numeric 1, 2, . . . , 9 or alphabetic a, b, . . . , z character and the predetermined files h.x, e.x, l.x, 1.x, o.x corresponding to the sequence form a PIN, for example 'hello', for access to the memory. The predetermined files (1.x, 2.x, . . . , 9.x, a.x, b.x, . . . , z.x) are only of reading, so that it is always possible to insert the PIN from the device.

According to a preferred embodiment, the microcontroller, in the presence of the predetermined sequence of requests for access, and only after its verification, send on the I/O circuitry of the memory the files h.x, e.x, 1.x, 1.x, o.x corresponding to the PIN 'hello', for giving back to the user the file as confirmation of access to the data. Preferably the files are of the sound type and, after the verification of the PIN, a sound file of confirmation of the correct insertion is reproduced.

According to an embodiment, the solid state memory also comprises a player that reproduces the PIN as a string of the reproductions of the files h.x, e.x, 1.x, 1.x, o.x.

The microcontroller, in the absence of the predetermined sequence of requests for access, sends the data to the device in ciphered format, according to what is described in the above method. In this case, the copy or the reading goes on but the digital content copied or reproduced is not for free and thus it cannot be used. In particular, it is provided that the data are stored in ciphered format in the memory and that the microcontroller is programmed for making the copy or the reading go on, only in case the predetermined sequence of requests for access is present.

Preferably, the solid state memory is an IC Card or a SIM for portable devices.

Advantageously, the content of a solid state memory is protected against non authorized copies or readings; only after having manually inserted a PIN, requested one or more times during the copying or the reading of its files, it is possible to go on with the use of the memory. Advantageously, the method and the memory may make it almost impossible for a non authorized copying or reading of the multimedia contents, i.e. a copy executed in the absence of the owner of the memory who knows the protection PIN and is present during the process of copy or of reading, allowing the execution of the process via the insertion of the PIN. Moreover, the protection of the contents is intrinsic in the memory since it implemented by the microprocessor; this allows the transfer of the memory contents from one device to another device together with the means and with the methodology of protection of the content. This methodology is intrinsically associated with the content itself of the memory, since the PIN can be associated with a predetermined selection of files of the memory.

That which is claimed:

1. A method for protecting digital contents of a solid state memory, the method comprising:
    accessing the digital contents, upon request, including copying or reading requested files of the digital contents;
    inserting, via a microprocessor associated with the solid state memory, at least one interruption during the accessing of the digital contents after copying or reading a first portion of the requested files of the digital contents; and
    proceeding with the accessing, including copying or reading a second portion of the requested files of the digital contents, based upon a user authentication procedure including, during the at least one interruption, verification of a PIN generated by the microprocessor, wherein the PIN comprises a sequence of virtual files simulated by the microprocessor and associated with respective physical blocks of the solid state memory, and the verification of the PIN comprises a user selecting each virtual file in a sequence corresponding to the sequence of virtual files that forms the PIN.

2. The method according to claim 1 wherein the at least one interruption comprises a substitution of the digital contents with altered data, and the accessing proceeds with the altered data if the user authentication procedure fails.

3. The method according to claim 1 wherein the at least one interruption comprises a reproduction of at least one of an audio and visual message to be understood by the user, the understanding of said message being necessary for executing the user authentication procedure.

4. The method according to claim 1, wherein the microprocessor prevents the accessing if a time elapsed between the at least one interruption and an inputting of the PIN is shorter than a threshold time, the threshold time representing a speed of manual input of the PIN.

5. The method according to claim 1, wherein the microprocessor detects a speed of the accessing and controls the inserting of the at least one interruption based upon the detected speed relative to a display speed or playback speed of the digital content.

6. The method according to claim 1, wherein the solid state memory comprises a memory of a Subscriber Identification Module (SIM) card.

7. The method according to claim 1 wherein the microprocessor transfers cryptographic data in response to a request for accessing when the verification of the PIN fails.

8. The method according to claim 1 wherein the sequence of virtual files corresponds to a plurality of requests for access to the respective physical blocks of the solid state memory storing the digital content, and the respective physical blocks are associated with at least one of non-erasable files and virtual files of the solid state memory.

9. A solid state memory device comprising:
    a solid state memory configured to store digital contents in files; and
    a microprocessor configured to insert at least one interruption during an accessing of requested files of the digital contents of the solid state memory after copying or reading a first portion of the requested files of the digital contents, and to execute a user authentication procedure to proceed with the accessing including copying or reading a second portion of the requested files of the digital contents, wherein the user authentication procedure includes a verification of a PIN generated by the microprocessor, wherein the PIN comprises a sequence of virtual files simulated by the microprocessor and associated with respective physical blocks of the solid state memory;
    the microprocessor being configured to prevent the accessing if a sequence of virtual files selected by the user during the verification of the PIN does not correspond to the sequence of virtual files that forms the PIN.

10. The solid state memory according to claim 9, wherein the microprocessor prevents the accessing if a time elapsed between the at least one interruption and an inputting of the PIN is shorter than a threshold time, the threshold time representing a speed of manual input of the PIN.

11. The solid state memory according to claim 9 wherein the at least one interruption comprises a substitution of the digital contents with altered data, and the accessing proceeds with the altered data if the user authentication fails.

12. The solid state memory according to claim 9 wherein the at least one interruption comprises a reproduction of at least one of an audio and visual message to be understood by the user for executing the user authentication procedure.

13. The solid state memory according to claim 9, wherein the solid state memory comprises a memory of a Subscriber Identification Module (SIM) card.

14. A solid state memory device comprising:
- a solid state memory configured including physical blocks to store digital contents in files; and
- a microprocessor configured to control access to the digital contents stored in the solid state memory;
- the microprocessor being configured to insert at least one interruption during an accessing of requested files of the digital contents stored in the solid state memory after copying or reading a first portion of the requested files of the digital contents, and to execute a user authentication procedure, comprising verification of a PIN generated by the microprocessor, to proceed with the accessing including copying or reading a second portion of the requested files of the digital contents, the PIN comprising a sequence of virtual files simulated by the microprocessor and associated with respective physical blocks of the solid state memory;
- the microprocessor being configured to prevent the accessing if a sequence of virtual files selected by a user during the verification of the PIN does not correspond to the sequence of virtual files that forms the PIN.

15. The solid state memory according to claim 14, wherein the microprocessor is configured to prevent the accessing if a time elapsed between the at least one interruption and an inputting of the PIN is shorter than a threshold time, the threshold time representing a speed of manual input of the PIN.

16. The solid state memory according to claim 14, wherein the at least one interruption comprises a substitution of the digital contents with altered data, and the accessing proceeds with the altered data if the user authentication fails.

* * * * *